United States Patent [19]
Rivin

[11] 4,358,215
[45] Nov. 9, 1982

[54] KEY CONNECTION

[76] Inventor: Evgeny I. Rivin, 17641 Wiltshire Blvd., Lathrup Village, Mich. 48076

[21] Appl. No.: 198,966

[22] Filed: Oct. 20, 1980

[51] Int. Cl.³ .............................................. F16B 3/00
[52] U.S. Cl. .................................... 403/357; 285/318
[58] Field of Search ............... 403/356, 357, 358, 355; 285/318; 29/240.5

[56] References Cited

U.S. PATENT DOCUMENTS

| | | | |
|---|---|---|---|
| 2,210,061 | 8/1940 | Caminez | 29/240.5 |
| 2,332,270 | 10/1943 | Shaw | 403/358 |
| 2,884,824 | 5/1959 | Sherman | 285/318 X |
| 3,024,326 | 3/1962 | Wischhusen | 403/355 X |
| 3,250,331 | 5/1966 | Boyle | 285/318 X |
| 3,421,783 | 1/1969 | Sakai | 403/357 |
| 3,464,542 | 9/1969 | Downing et al. | 29/240.5 |

FOREIGN PATENT DOCUMENTS

| | | | |
|---|---|---|---|
| 484214 | 6/1952 | Canada | 285/318 |
| 2361817 | 6/1974 | Fed. Rep. of Germany | 403/356 |

*Primary Examiner*—Andrew V. Kundrat
*Attorney, Agent, or Firm*—Krass, Young & Schivley

[57] ABSTRACT

A key connection having the key shaped like a round helical spring and inserted, with possible preload, into the keyslots of a triangular cross-section shape.

9 Claims, 7 Drawing Figures

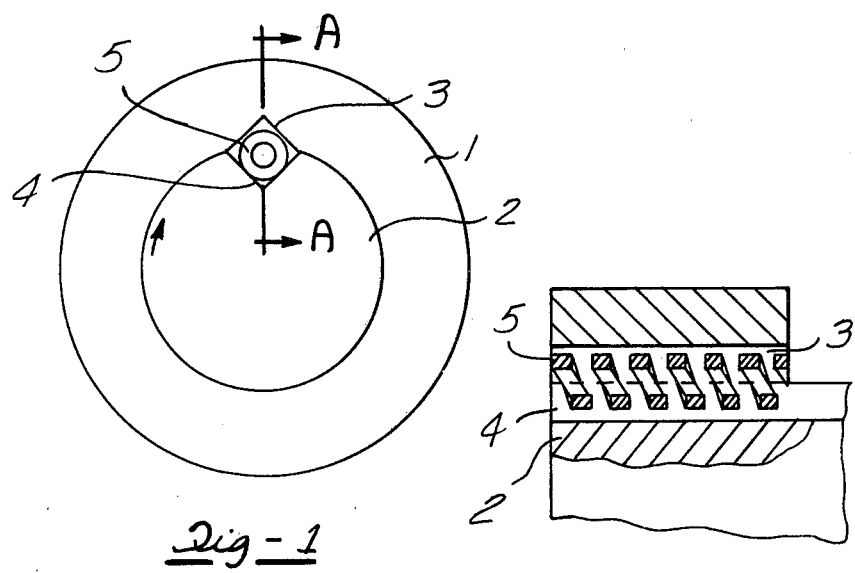
*Fig-1*
*Fig-2*
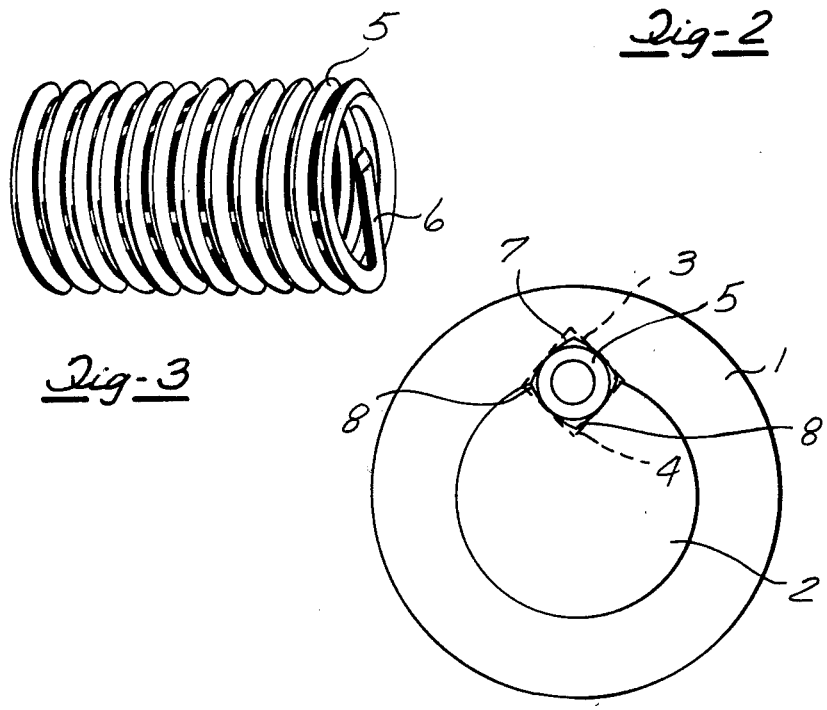
*Fig-3*
*Fig-4*

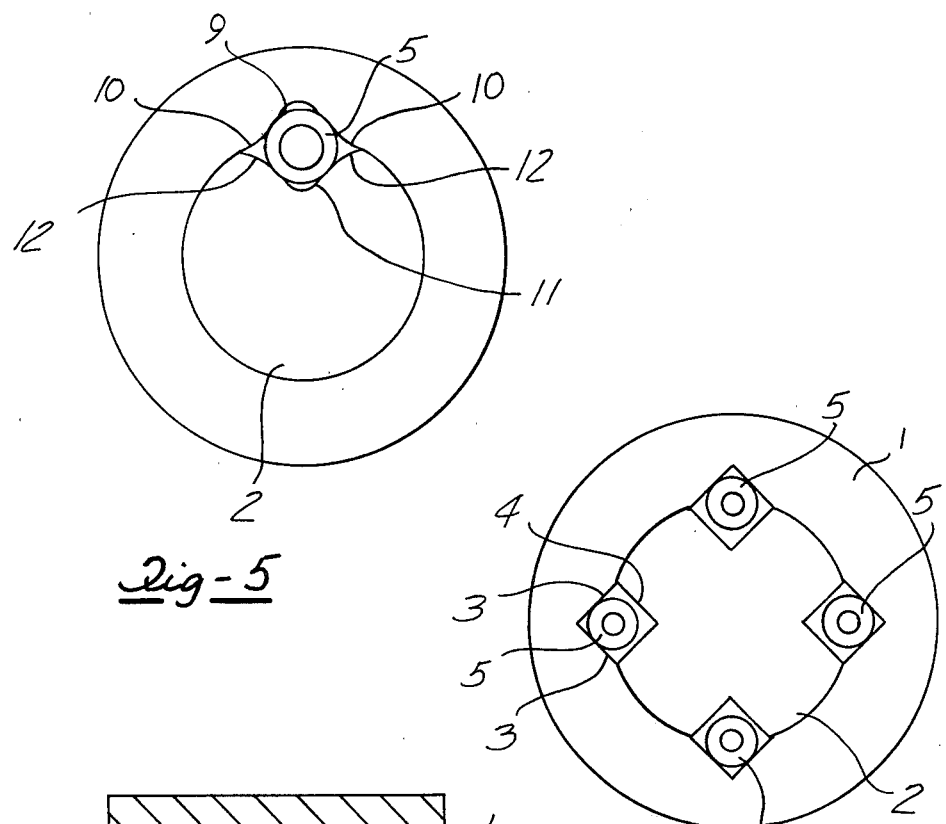
Fig-5
Fig-6
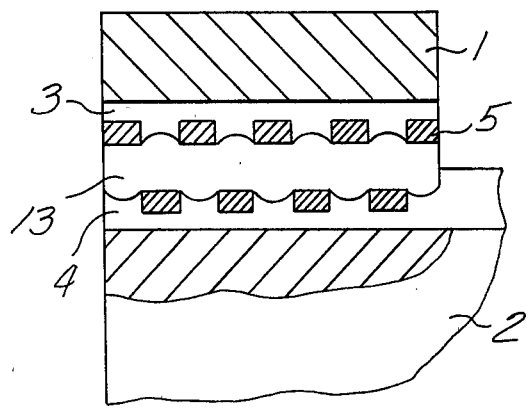
Fig-7

KEY CONNECTION

BACKGROUND OF THE INVENTION

1. Field of the Invention

This invention relates to connecting elements for components of mechanical assemblies and in particular, to connecting keys.

2. Description of the Prior Art

Key connection conventionally consists of a key engaged with slots or other recesses fabricated in the mating surfaces of two components being joined. In some cases, to improve concentricity and/or increase load-carrying capacity of power-transmission joints, multiple keys or their modification—a spline connection is used.

Due to inevitable tolerances of keyslot dimensions in both components to be connected and of the key itself, usually the key is pressfitted in one component's keyslot and loose in another component's keyslot. The interference fit in the first said keyslot should not be too tight because of possible assembly/disassembly difficulties, thus the key has to be machined during the assembly, especially for maintenance purposes. A loose fit leads to inevitable backlashes which may cause high impact loads leading to further loosening and deterioration of the key.

A conventional keyslot (e.g. for square or Woodruff key) has sharp inside corners causing stress concentration and crack generation both in the shaft and sleeve. Making generous fillets and special key shapes to reduce stress concentration, such as Orthwein teaches in U.S. Pat. No. 3,920,343, requires more complicated tooling, more expensive keys and also reduces load carrying and guiding areas of the keyslot thus necessitating making it deeper. But even a conventional keyslot substantially weakens a component crossection, and the modified keyslot weakens it to a greater degree.

In many cases, heat treatment (hardening) of the slotted portion would greatly improve the load carrying capacity (fatigue and/or wear resistance) of the whole assembly. However, this cannot be done neither before cutting the keyslot because of impaired machining conditions nor after the keyslot had been cut because inevitable distortions would make key fit procedure difficult or even impossible.

Prior methods were proposed to reduce backlash and increase load carrying capacity of a key connection, e.g. by using cylindrical key inserted in a hole having been drilled in the contact area of two components being connected, at the time of assembly. However, this requires more skilled labor for the assembly process and also makes repair difficult after the initial keyslots had worn out and changed their dimensions and shape.

SUMMARY OF THE INVENTION

This invention is directed to an improved form of key connection for mechanical assemblies, especially for power transmission. Broadly, the invention involves using a helical spring-like element as a key, with relatively shallow keyslots of generalized triangular shape. The initial external dimension (diameter) of the key can be larger than opening designed for the key in the assembly, thus the spring-like key has to be pretwisted around the axis of winding before the insertion in the said opening and after the insertion stays in the assembly in a preloaded condition. Due to axial flexibility of the spring-like structure, the key follows the actual shape of the keyslots during the insertion process but after loading with the preload force or payload, each coil of the spring-like key contacts the keyslot surfaces at least in two points, thus cementing the key in a strong force-transmitting element.

This invention solves the problem of backlash elimination in the connection, because the flexible key envelops the keyslot surfaces and contacts them with an initial preload.

This invention also provides a key connection relatively insensitive to machining tolerances of the keyslots in both connected components, thus eliminating the need in special fitting during assembly and allowing heat treatment of the portions with the keyslots.

This invention further leads to a stronger assembly due to smaller keyslot crossections and less stress concentration.

Other objectives, advantages and applications of the present invention will be made apparent from the following detailed description of the preferred embodiments of the invention.

BRIEF DESCRIPTION OF THE DRAWINGS

FIG. 1 illustrates a first embodiment of my invention wherein the key has a simple helical spring-like shape without modifications and is inserted in the connected components without preload.

FIG. 2 illustrates a crossection of FIG. 1 by A—A plane.

FIG. 3 illustrates another embodiment of the key wherein it has a modified end coil to create a lever for reducing diameter of the key immediately before its insertion.

FIG. 4 illustrates another embodiment of my invention wherein sides of both triangular keyslots have a concave cylindrical shape.

FIG. 5 illustrates yet another embodiment of my invention wherein edges of both triangular keyslots are smoothed by fillets.

FIG. 6 illustrates another embodiment of my invention wherein there are four connecting keys between the components to be connected.

FIG. 7 illustrates yet another embodiment of my invention wherein internal volume of the hollow key is filled up with an insert.

DESCRIPTION OF THE PREFERRED EMBODIMENTS

Referring to FIG. 1, 1 and 2 are two mechanical components to be connected (in this case, sleeve and shaft, respectively). Component 1 has a keyslot 3 of triangular crossection made in it, component 2 has a triangular keyslot 4, preferably with the same dimensions as the keyslot 3. Components 1 and 2 are assembled in such a way that the keyslots 3 and 4 are situated adjacently, thus said keyslots create a common opening (channel) of quadrangular crossection. Key 5 is inserted in that quadrangular opening securing connection between the components 1 and 2 in rotational direction.

FIG. 2 together with FIG. 1 show that the key 5 is, in effect, a round helical spring. The spring-like key in FIG. 2 is wound out of square-crossection wire, but wire of any other crossection can be used.

In operation, rotation of a driving component (e.g., shaft 2 in FIG. 1 in the arrow direction ) tends to compress the spring-like key 5 between the left side of the keyslot 4 and right side of the keyslot 3, thus transmitting the driving force from the driving component 2 to the driven component 1. All coils of the spring-like key 5 are compressed in parallel, thus in the force transmission the spring-like key 5 is acting as equivalent to a solid tube.

In the course of compression, diameter of the key 5 in the force direction is contracting and the perpendicular diameter is expanding. When the amount of expansion exceeds the initial clearance between the key 5 and the walls of the opening created by the keyslots 3 and 4, coils of the key 5 would contact the left side of the keyslot 3 and the right side of the keyslot 4, thus substantially changing the loading conditions of the key 5 and greatly increasing its stiffness and load-carrying capacity. The moment (load magnitude) of this change can be monitored by adjusting the amount of clearance between the key 5 and said opening created by the keyslots 3 and 4.

As stated before, the spring-like key transmits load as if it was a solid tube due to effective solidification of the key structure by the friction forces between external surfaces of the key and internal surfaces of the keyslots. However, during insertion, when load is not transmitted and friction forces are not effective, the key accomodates itself to irregularities and inaccuracies of the keyslot surfaces as a flexible body. Consequently, the proposed key connection does not require strict tolerances on keyslots machining or fitting the key during assembly. In some cases, keyslots after casting, forming etc. could be not machined at all with substantial savings. By the same reasons, a component can be hardened by heat-treatment after keyslot were fabricated, without special attention to inevitable dimensional distortions. In the conventional designs, heat-treatment of the slotted components is not frequently used because said distortions make key-fitting a difficult procedure.

A spring-like key has, of course, substantially smaller effective crossection area than a conventional key for the similar connection. However, strength of the key (specifically, shear strength) is not noticeably reduced, because spring is fabricated from cold drawn wire having 2–3 times better mechanical properties (yield stress, strength etc.) than solid bars of mild steel being used for conventional keys. If need for a stronger key arises, the spring could be heat-treated resulting in even higher strength.

As previously noted, backlash in a key connection could be very detrimental to a machine performance, leading to intensive impact loads, inaccurate positioning of the connected components etc. Fitting a conventional key in such a way that it has interference fit with both connected components is a difficult procedure. Even if it was done, after the breaking-in period the key could become loose.

My invention allows this problem to be resolved and realize a key connection without backlash and even with preload. To achieve this effect, external diameter of the spring-like key 5 before the assembly (free diameter) has to be larger than the diameter of inscribed circle for the quadrangular opening created by the keyslots 3 and 4. In this case, the spring-like key must be twisted around its axis before insertion to adequately reduce its external diameter. After insertion, the spring-like key tends to unwind, thus exerting the preload force onto sides of the keyslots 3 and 4. Degree of the preload can be monitored by varying free external diameter, number of coils, crossection shape and diameter of wire and other parameters of the key.

A modification of the key 5 shown in FIG. 3 has its end coil deformed (bent inside) thus creating a tongue 6. The tongue 6 can be used to facilitate insertion of the key 5 with preload by serving as a lever to be operated by pliers or a similar tool to twist the key around its axis. Shape of the tongue 6 can vary substantially, either in one plane or in three dimensions. It could be convenient in some cases to have tongues 6 on both ends of the key.

The twisting of the spring-like key 5 could be helpful both for assembly/disassembly purposes and to allow relative displacement of the connected components 1 and 2. In the latter case, e.g., in gearboxes with shifting gears, some automated mechanism can be used for the twisting procedure.

Due to round crossection of the key 5, its very high strength noted above and very high possible strength of the connected components 1 and 2 due to simplified heat treatment option, crossection of both keyslots 3 and 4 can be substantially reduced as compared with conventional (rectangular, Woodruff etc.) keyslots. Thus, effective crossection area and subsequently strength of both connected components is further enhanced.

FIG. 4 shows how the load-carrying capacity of the connection can be enhanced even further if the critical member of the connection is the key itself. By making sides 7, 8 of the keyslots cylindrical by concave instead of flat as in FIG. 1 and as shown by dotted lines in FIG. 4, Hertzian stresses or contact stresses between the key and the keyslots are reduced for the same transmitted load, thus the key (and the keyslots) can be reduced in size. In addition, the keyslot crossection area is reduced due to its modified shape. Both of these factors lead to further increase of the effective crossection area of the connected components 1 and 2 and enhancement of their strength. The modified keyslot profile can be used on both connected parts or on any one of them.

Numerous research works have shown, that connected by keys components of power transmission mechanisms fail often due to cracks caused by stress concentration in sharp corners of the keyslots. Smoothing down these corners by fillets lead to more expensive key blanks and more difficult fitting procedure and thus is not used very much. In the proposed system, only the middle portion of the keyslot surface is being used, thus both internal and external corners of or both keyslots can be smoothed down by generous fillets 9, 11 and 10, 12 respectively, as shown in FIG. 5. This modification even further enhances fatigue resistance of the connected components.

FIG. 6 shows another modification of the invention wherein several identical key connections are utilized to balance forces between the connected components, increase load-carrying capacity or reduce radial dimensions of the connection because of using smaller size keys and keyslots.

In cases where stiffness and/or strength of the connection must be increased, reinforcement of the spring-like key as shown in FIG. 7 can be exploited. Reinforcement is being achieved through filling the hollow portion of the key 5 with some hard insert. The insert may have a shape of a threaded stud as it is shown in FIG. 7 or it can be formed in place a core from rigid structural foam or another spring inserted with preload inside the key 5 and "hardened" by friction forces or other designs according to specific circumstances.

All the drawings show parts of shaft-sleeve connection. It should be understood that the invention is fully applicable to joining any components and not necessarily in machines but also in building constructions etc.

The invention has been described with reference to specific embodiments, and it is to be understood that although the embodiments represent the best made in practising the invention known to the inventor at the time of filing the patent application, various modifications to the illustrated embodiments are possible and accordingly the foregoing description is not to be construed in a limiting sense.

The embodiments of the invention in which an exclusive property or privilege is claimed are defined as follows:

1. A key connection between two components, comprising:

keyslots in the first and second components to be connected, said keyslots being situated adjacent to each other to create a common opening for insertion of a key;

a key having a helical spring-like shape and inserted in said opening;

the key having a free external diameter before assembly larger than the diameter of the inscribed circle of said opening for key insertion, whereby the key must be twisted around its axis before insertion or for disassembly or for relative displacement of the connected components in order to reduce its external diameter to less than the diameter of the inscribed circle of said opening so as to establish a preload force on the keyslots;

the degree of preload force being established by utilizing parameters which include the free external diameter of the key, the number of coils, and the cross-sectional shape and diameter of the key stock.

2. The key connection of claim 1 wherein the key has its end coil deformed to provide a lever for twisting the key around its axis before insertion, during disassembly or for relative displacement of the components.

3. The key connection of claim 1 wherein said keyslot in the first component has a triangular crossection.

4. The key connection of claim 1 wherein said keyslots in the first and second connected components have triangular crossections.

5. The key connection of claim 1 wherein the sides of said keyslot have a concave cylindrical shape.

6. The key connection of claim 1 wherein the sides of said keyslots in the connected components have concave cylindrical shapes.

7. The key connection of claim 1 wherein the edges of said keyslots are smoothed out with fillets.

8. The key connection of claim 1 wherein the first and second connected components both have an equal number other than one of adjacently situated keyslots, each pair of said keyslots creating an opening with the helical spring-like key inserted in each of said openings.

9. The key connection of claim 1 wherein the internal volume of the spring-like key is filled with another body.

* * * * *